S. PARDA.
BICYCLE CONSTRUCTION.
APPLICATION FILED JULY 27, 1916.
1,205,382.
Patented Nov. 21, 1916.
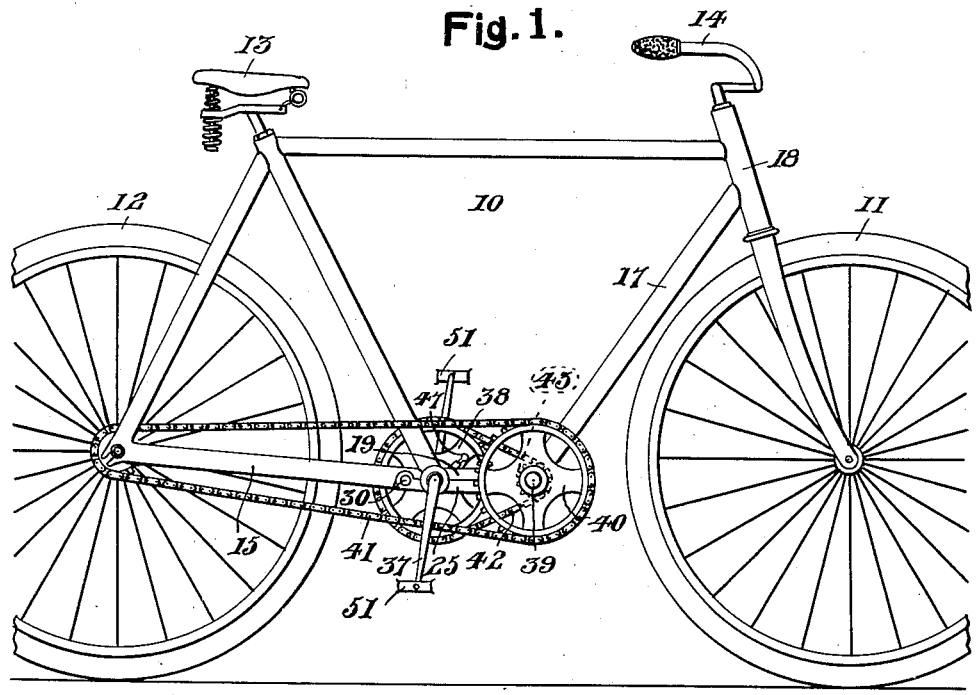
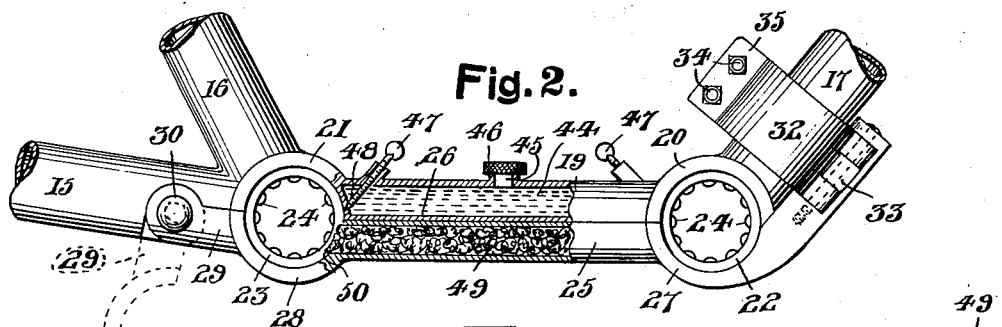
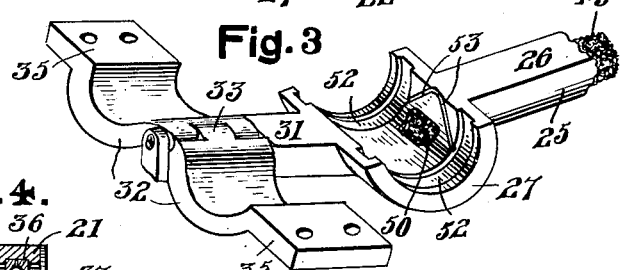
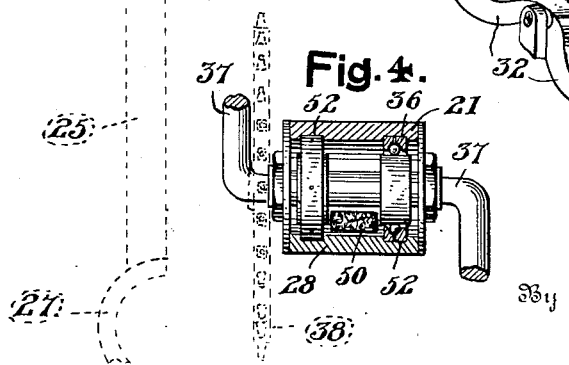
Inventor
S. Parda
By A. M. Wilson
Attorney

UNITED STATES PATENT OFFICE.

STANLEY PARDA, OF NORTH ADAMS, MASSACHUSETTS.

BICYCLE CONSTRUCTION.

1,205,382.  Specification of Letters Patent.  Patented Nov. 21, 1916.

Application filed July 27, 1916. Serial No. 111,619.

*To all whom it may concern:*

Be it known that I, STANLEY PARDA, a subject of the Czar of Russia, residing at North Adams, in the county of Berkshire and State of Massachusetts, have invented certain new and useful Improvements in Bicycle Construction, of which the following is a specification.

This invention relates to certain new and useful improvements in bicycle construction.

The primary object of the present invention is the provision of a bicycle frame having a ready means whereby the crank shaft bearing or bearings are readily accessible, the same being operable for removing the bearings and crank shafts at will and normally supporting the same in their operative positions.

A further object of the device is the provision of a bicycle frame arranged with speed increasing sprocket members, arrangement being made for detachably mounting the said members providing an advantageous lubricating device in connection therewith.

A still further object of the device is to provide a combined bearing support and lubricating means forming a part of a bicycle frame whereby the bearings for the propelling means may be readily removed when desired as well as uniformly lubricated during operation.

In the drawings forming a part of this application and in which like designating characters refer to corresponding parts throughout the several views:—Figure 1 is a side elevation of a bicycle provided with the present device, parts being broken away. Fig. 2 is an enlarged side elevation of the lower central portion of the bicycle frame with the sprocket mechanism removed and parts broken away, the adjustable bearing support member being shown by dotted lines in its open position. Fig. 3 is a perspective view of the forward end portion of the supporting member detached, and, Fig. 4 is a vertical radial sectional view through the crank shaft bearing, the sprocket wheel being shown in dotted lines.

The present device is adaptable for different forms of vehicles including bicycles, the same being herein illustrated in connection with a bicycle 10 having forward and rear wheels 11 and 12, a seat 13 and handle bars 14.

The lower rear fork 15 of the frame is connected at its forward end to the bottom of the inclined middle brace 16 in substantially the usual manner, the forward lower bar or brace 17 connecting the point of jointure between the fork 15 and brace 16 with the bicycle head 18 being arranged with a horizontal mounting portion 19. Half bearings 20 and 21 are arranged respectively at the forward and rear ends of the horizontal portion 19 being substantially semi-circular in cross-section and adapted for the reception of bearing cages 22 and 23 in which cages anti-friction balls 24 are positioned.

A separable mounting section 25 is provided of the same length as the horizontal portion 19, the said section and portion being each substantially semi-circular in cross-section with flattened sides 26 adapted for flat engagement with each other, thereby forming a substantially cylindrical member. The mounting section 25 is provided with half bearings 27 and 28 at the front and rear ends thereof adapted for coöperating with the aforementioned half bearings 20 and 21 respectively, forming complete cylindrical bearings for the cages 22 and 23. A rear extension 29 extends from the half bearings 28 hinged as at 30 to the fork 15 and whereby the mounting section 25 is capable of swinging movement for separating the lower halves of the said bearings from the respective upper halves thereof when found desirable.

A forward extension 31 is carried by the half bearing 27 extending angularly therefrom and adapted for flatly engaging the forward face of the front brace 17, substantially semi-circular inclosing clamps 32 being hinged as at 33 to the said forward extension adapted for inclosing the forward brace 17 maintaining the aforementioned faces 26 of the members 19 and 25 in flat engagement with the bearings operatively arranged. Lock bolts 34 are provided through projecting flanges 35 of the said clamp members 32 for retaining the clamp upon the said brace. Semi-circular grooves 52 are arranged in the half bearings 27 and 28, similar coöperating grooves 36 being arranged in the half bearings 20 and 21 within which grooves the cages 22 and 23 are removably positioned, being secured therein when the mounting section 25 is in its horizontally closed position and radially removable therefrom when the mounting section is released by opening the clamp 32 and the section swung downwardly as illustrated by dotted lines in Fig. 2.

A crank shaft 37 is adapted to be journaled through the rear bearing so formed anti-frictionally mounted upon the balls of the cages 23, a sprocket wheel 38 being arranged upon the said shaft. A stub shaft 39 is journaled upon the balls 24 of the cages 22 of the forward bearing supporting a sprocket wheel 40 operatively connected by means of a chain 41 with the rear wheel 12. The sprockets 38 and 40 are operatively connected together by means of a chain 42 passing over the sprocket 38 and also over a pinion 43 mounted upon the stub shaft 39 at the opposite side of the frame from the sprocket 40.

The horizontal frame portion 19 is tubular in form having a lubricating chamber 44 arranged therein for receiving a suitable lubricant such as oil, through an entrance nipple 45 normally closed by a cap 46. Needle valves 47 are obliquely arranged through the chamber 44 for controlling outlet ports 48 between the oil chamber 44 and the opposite half bearings 21 substantially centrally thereof.

The mounting section 25 is hollow having a packing 49 longitudinally extending therethrough with its opposite ends slightly projecting as at 50 centrally within the half bearings 27 and 28. Diverging oil passages 53 are provided in the half bearings 27 and 28 communicating with the grooves 52 thereof and uniting substantially at the face 26 of the mounting section 25, the passages 53 being in this manner arranged above the packing ends 50 and directly beneath the oil outlet ports 48 when the device is operatively assembled. The lubricating arrangement thus provided allows the flow of oil from the chamber 44 to be controlled by the needle valve 47 as the oil passes through the ports 48 to the grooves 52.

The operator of the bicycle seated upon the saddle 13 forcibly moves the pedals 51 in the usual manner causing the forward sprocket 50 to revolve at an increased rate of speed while the power transmitting chain 41 between the forward sprocket and the rear wall communicates motion to the latter also at an increased speed. The manner of gaining access to the ball cages 22 and 23 for removing the same has been heretofore fully described, it being understood that the crank shaft 37 and stub shaft 39 are removable therewith while the said shafts are normally supported in their operative positions by the mounting section 25 when closed. A serviceable arrangement for bicycle frames is arranged comprising a mount for removable bearings as well as the lubricating means therefor.

What I claim as new is:—

1. A bicycle frame having a horizontal shaft supporting section comprising a horizontal frame portion, half bearings at the opposite ends of said portion, a mounting section pivotally arranged with respect to the said portion, half bearings at the opposite ends of the said section adapted for coöperating with the aforementioned half bearing sections when the said mounting section and portion are in operative engagement, and clamp connections between the said mounting section and horizontal portion.

2. A device of the class described comprising in combination with a bicycle frame having a lower rear fork connected to the middle brace of the frame and with a forward lower bar attached at its upper end to the head thereof, a horizontal supporting portion connecting the lower end of the said forward bar with the point of attachment between the said fork and middle brace, half bearings arranged at the opposite ends of the said support positioned transversely of the frame, a mounting section of substantially the same length and shape as the said supporting portion, half bearings at the opposite ends of the said section adapted for coöperating with the aforementioned half bearing sections when the said mounting section and supporting portion are in longitudinal engagement with each other, hinge connections between the said fork and one of the half bearings of the said mounting section, and releaseable clamp connections between the other half bearing of the said mounting section and the forward bar of the frame.

3. A device of the class described comprising in combination with a bicycle frame having a lower rear fork connected to the middle brace of the frame and with a forward lower bar attached at its upper end to the head thereof, a horizontal supporting portion connecting the lower end of the said forward bar with the point of attachment between the said fork and middle brace, half bearings arranged at the opposite ends of the said support positioned transversely of the frame, a mounting section of substantially the same length and shape as the said supporting portion, half bearings at the opposite ends of the said section adapted for coöperating with the aforementioned half bearing sections when the said mounting section and supporting portion are in longitudinal engagement with each other, hinge connections between the said fork and one of the half bearings of the said mounting section, releaseable clamp connections between the other half bearing of the said mounting section and the forward bar of the frame, coöperating grooves upon the inner faces of the said bearing sections, antifriction ball mounting cages within the said grooves, and operating shafts journaled within the said cages.

4. A device of the class described comprising a bicycle frame having a lower horizontal supporting portion between the rear fork and front brace of the frame, half bearings arranged at the front and rear ends of the said portion transversely of the frame, the said supporting portion being substantially semi-circular in cross-section with a flattened lower face, a mounting section of substantially the same form and dimensions as the said supporting portion adapted for flat engagement therewith forming a cylindrical member, half bearings at the opposite ends of the said mounting section adapted for coöperation with the aforementioned half bearings, a forward extension angularly carried by the forward half bearing of the said mounting section normally seated against the said forward brace, hinge clamping members upon the said forward extension detachably arranged encircling the said brace, a rear extension upon the rearward half bearing of the said mounting section, and hinge connections between the said rear fork and rear extension.

5. A bicycle frame comprising a lower horizontal supporting portion having a lubricating chamber therein, a tubular mounting section hingedly positioned in normal contact beneath the said supporting portion, shaft bearings at the opposite ends of the said supporting portion and mounting section, regulated oiling ports between the said chamber and bearings, and an absorbent packing longitudinally arranged through the said mounting section projecting within the said bearings beneath the said ports.

6. A bicycle frame comprising a lower horizontal supporting portion having a lubricating chamber therein, a tubular mounting section hingedly positioned in normal contact beneath the said supporting portion, shaft bearings at the opposite ends of the said supporting portion and mounting section, regulated oiling ports between the said chamber and bearings, an absorbent packing longitudinally arranged through the said mounting section projecting within the said bearings beneath the said ports, a connecting nipple for the said chamber, a closure cap for the said nipple, needle valves for the said ports extending through the said chamber and projecting above the said supporting portion, the half bearings of the said mounting section having diverging oil passages therein arranged beneath the said ports when the device is operatively positioned.

In testimony whereof I affix my signature.

STANLEY PARDA.